INVENTOR
JOHN H. MACNEILL
BY Hurvitz + Rose
ATTORNEY

INVENTOR
JOHN H. MACNEILL
BY Hurvitz + Rose
ATTORNEY

LATCHED TAPE READER

Filed Nov. 13, 1959 8 Sheets-Sheet 3

INVENTOR
JOHN H. MACNEILL
BY Hurvitz + Rose
ATTORNEY

Nov. 9, 1965 J. H. MacNEILL 3,217,141

LATCHED TAPE READER

Filed Nov. 13, 1959 8 Sheets-Sheet 4

INVENTOR

JOHN H. MACNEILL

BY Hurvitz & Rose

ATTORNEY

Nov. 9, 1965

J. H. MacNEILL 3,217,141

LATCHED TAPE READER

Filed Nov. 13, 1959

8 Sheets-Sheet 5

INVENTOR

JOHN H. MACNEILL

BY Hurvitz & Rose

ATTORNEY

Nov. 9, 1965 J. H. MacNEILL 3,217,141

LATCHED TAPE READER

Filed Nov. 13, 1959 8 Sheets-Sheet 6

INVENTOR

JOHN H. MACNEILL

BY Hurvitz & Rose

ATTORNEY

INVENTOR
JOHN H. MACNEILL
BY Hurvitz + Rose
ATTORNEY

Nov. 9, 1965 J. H. MacNEILL 3,217,141

LATCHED TAPE READER

Filed Nov. 13, 1959 8 Sheets-Sheet 8

INVENTOR
JOHN H. MACNEILL
BY Hurvitz & Rose
ATTORNEY

United States Patent Office 3,217,141

Patented Nov. 9, 1965

3,217,141

LATCHED TAPE READER

John H. MacNeill, Melbourne, Fla., assignor to Soroban Engineering, Inc., Melbourne, Fla., a corporation of Florida Filed Nov. 13, 1959, Ser. No. 852,798
17 Claims. (Cl. 235—61.11)

The present invention relates to reading mechanisms and more particularly to a reading mechanism for perforated, information-bearing cards or tapes.

It is an object of the present invention to provide a long-lived, and rugged perforated member reading mechanism employing mostly metal stampings which may be easily fabricated and utilizing very few machined parts.

It is another object of the present inventon to provide a reading mechanism for perforated members in which, once a reading operation has been initiated, all the elements of the apparatus are latched in predetermined positions so that the reading cycle must be completed and must thereafter be followed by a feeding cycle.

Yet another object of the present invention is to provide a reading mechanism for perforated members that may be operated in the forward or reverse feeding directions and in which, regardless of the direction fed, reading of the perforated member is followed by feeding of the member and once a reading operation has been initiated, the various elements of the mechanism are latched in predetermined positions so that the reading cycle must be completed and must thereafter be followed by a feeding cycle.

It is another object of the present invention to provide a latched reading mechanism for perforated members which is substantially insensitive to shock and vibration.

It is still another object of the present invention to provide a reading mechanism in which the major operational control components are latched in both their actuated and unactuated positions and in which the members cannot be dislodged from either of their aforesaid positions by vibration or shock since unlatching requires movement of two cooperating latch members in opposite directions.

It is another object of the present invention to provide a feeding mechanism for perforated member sensing mechanisms in which impacts are minimized during tape transport so as to insure very long life of the feeding mechanism and of the perforated member.

It is yet another object of the present invention to provide a perforated member reading mechanism having a drive apparatus which permits the perforated member, particularly if it is a tape, to be slewed through the mechanism by merely pulling on the tape.

It is still another object of the present invention to provide a perforated member sensing mechanism in which the perforated member may be slewed through the mechanism and wherein a counter may be provided which at all times indicates the position of the tape regardless of whether it has been fed intermittently by the feed apparatus of the mechanism or has been slewed forward or backward by pulling on the tape externally of the apparatus.

Yet another object of the present invention is to provide a dog clutch for selectively coupling a source of rotary mechanical power to a perforated member transport mechanism whereby the member is subjected to controlled acceleration and deceleration so as to minimize wear on the feed holes and whereby the member may be slewed through the apparatus upon disengagement of the clutch.

It is another object of the present invention to provide a perforated tape sensing mechanism having a tight-tape and a no-tape sensing apparatus which is interconnected with a conventional tape depressor so as to facilitate loading of the tape and further to permit the tight-tape, no-tape sensor to operate independently of the tape depressor so as to permit de-energization of the apparatus in response to an excessively tight tape or no tape.

It is another object of the present invention to provide a latched perforated member reading mechanism in which reading cycles may be intermittently initiated or may be continuously initiated.

It is still another object of the present invention to provide a latched perforated member reading mechanism which may be operated synchronously or asynchronously with external equipment.

It is yet another object of the present invention to provide a latched reading mechanism in which most of the operating members are metal stampings and in which wear between relatively movable surfaces is minimized by disengaging the surfaces prior to movement therebetween.

It is another object of the present invention to provide a perforated member reading apparatus in which the perforations in a column are read in parallel and in which the information obtained therefrom may be read out serially.

It is yet another object of the present invention to provide a perforated member reading mechanism which is explosion-proof.

In accordance with the present invention there is provided a plurality of perforation-sensing pins arranged in a row perpendicular to the direction of movement of the perforated member to be sensed. For the purpose of description, the perforated member will hereinafter be referred to as a tape although it is not intended to limit the applicability of the invention to a tape since perforated cards and other perforated information-bearing members may be sensed by the apparatus of the invention. The sensing pins are carried in a cross member of a bail and may move vertically with respect thereto. By effecting vertical movement of the bail, the pins are brought downwardly into engagement with the tape and those pins which are aligned with an aperture in the tape move into it and do not move with respect to the bail. However, those pins which are not aligned with a perforation in the tape and therefore encounter a web portion thereof, cannot follow the complete downward movement of the bail and move relative thereto. Leaf spring switches are employed for sensing the movement of the pins, the switches having spring members in engagement with the tops of the sensing pins. The switch conditions may be sensed by external circuits as indicative of the presence or absence of perforations at each information area on the tape.

The tape is advanced by a drive sprocket positioned below and immediately forward of the sensing pins and is mounted on an intermittently rotated shaft. The shaft for rotating the drive sprocket and a shaft employed to produce vertical reciprocation of the bail are interconnected by a drive control mechanism which insures that, once a reading cycle has been instituted, it will, of necessity, be followed by a feed cycle so long as mechanical power is supplied to the machine. In order to insure that each read cycle is followed by a feed cycle, there is provided a main timing shaft for the apparatus which drives cams having in engagement therewith apparatus for initiating feeding and reading cycles. A solenoid is employed to initiate such a cycle and has an armature which is latched in a solenoid unactuated position except during a predetermined interval in the cycle of rotation of the main timing shaft. During this interval the armature is unlatched and if the solenoid is energized, the armature is permitted to move to a second position where it becomes latched at the end of the predetermined interval. Initial movement of the armature to its second position unlatches an arm which, at a predetermined position in the cycle, is rotated by the timing mechanism to effect downward movement of the sensing bail. Movement of the armature to its second position also permits movement of an arm in one direction to partially unlatch the feeding mechanism. However, a feed cycle cannot be initiated at this time, since two distinct unlatching operations must be effected and the movement of the armature only produces one of these. After the termination of the reading cycle, the timing mechanism effects the second unlatching operation of the feed control mechanism, moving still another arm in a direction opposite to movement of the first arm thereby permitting a pawl to be rotated into position between the teeth of a toothed wheel. The pawl and toothed wheel constitute a dog clutch arrangement and after the pawl has been inserted between the teeth of the wheel, the pawl is rotated about the axis of the wheel so as to produce rotation of the toothed wheel. The rotation of the toothed wheel rotates a tape drive sprocket, controlled acceleration and deceleration being imparted to the tape due to the action of the clutch. Immediately after the feeding operation, the same timing mechanism which placed the pawl between the teeth of the wheel withdraws the pawl therefrom and upon doing so unlatches the armature of a solenoid so as to terminate a single cycle of operation. If the solenoid is now de-energized, the armature of the solenoid is latched in its first or unactuated position and the apparatus cannot effect a second reading and feeding cycle until the solenoid is again energized and the apparatus has reached a place in its cycle of operation when the armature is unlatched and is permitted to move to its second position of operation. It is seen that the mechanisms are latched in their various positions both in the unactuated and actuated conditions and therefore a cycle cannot be inadvertently initiated or inadvertently terminated prior to completion thereof by either shock or vibration. An important feature of the invention is that the two unlatching operations which must be performed in order to permit a feed cycle to be initiated, require motions in opposite directions and it is exceedingly unlikely that vibration or shock could produce oppositely directed motions in two members. Further, all operations are controlled by a single cam which effects the same sequence of operations regardless of its direction of rotation. However, the direction of rotation of the cam does determine the direction of rotation of the dog clutch and therefore determines the direction of feed of the tape. In consequence, the same sequence of operations is established whether forward or reverse feed is desired.

The utilization of the dog clutch permits slowing of the tape by merely withdrawing a detent, which is employed to maintain the toothed wheel in a given position between feed cycles, from engagement with the toothed wheel. Between feed cycles the toothed wheel is completely decoupled from its driving member, the pawl, and the detent is the only member tending to hold the toothed wheel in place. Therefore, when the detent is withdrawn, the tape which is driven by a sprocket mounted on the same shaft as the toothed wheel is not subject to any loading and it may be pulled either forward or backwards through the mechanism. A mechanical counted such as a Veeder-Root counter may be directly or indirectly secured to the same shaft as the toothed wheel and the sprocket, to indicate at all times the number of units of information which has been processed by the apparatus. Since each unit of information has a fixed location on the tape, the number recorded by the counter not only indicates the number of units processed but also indicates the location of the tape which is of great importance in locating specific recorded data where tape slewing is employed.

In order to maintain the tape on the sprocket, there is employed a conventional tape depressor which, however, is interconnected with a tight-tape and a no-tape sensing mechanism. The latter mechanism defines a loop of tape by means of a roller carried on a shaft which is supported on an arm rotatable about a further shaft. The tape depressor and the roller are interconnected such that when the tape depressor is moved out of engagement with the sprocket, the roller is raised to permit the tape to initially be passed thereunder. When the tape depressor is moved downwardly into engagement with the drive sprocket, the roller is moved down to form a loop in the tape. A switch is employed which, when the roller and the tape depressor are in their operating position, the apparatus of the invention may be energized but if the tape depressor is raised, thereby raising the roller, the switch is actuated to an open position and prevents operation of the apparatus. Further, if undue tension is established in the tape, the roller is raised against a spring force and when raised sufficiently actuates the same switch to produce de-energization of the apparatus. Upon loss of tape the roller is further depressed and through the same linkage opens a second switch to de-energize the apparatus. An important feature of the tight-tape, no-tape mechanism is that it defines a loop of tape of sufficient length to permit two cycles of operation to be completed after sensing a tight tape without placing sufficient strain on the tape to tear it. More particularly, a feed cycle in the apparatus of the invention follows a read cycle and is, in point of time, relatively close to the end of a cycle of operation. Since the tight tape situation is sensed during a feed cycle, it has been found that it is not always possible to de-energize the control solenoid sufficiently rapidly to prevent the apparatus from going into the next cycle of operation after the tight tape is sensed. The tight tape sensing apparatus opens the circuit to the control solenoid but if the field of the solenoid does not collapse sufficiently to permit the armature to return to its unactuated or first position before the next cycle of operation is initiated. Consequently in order to prevent tearing of the tape, sufficient tape must be provided to permit one feed cycle to take place after the cycle during which the tight tape was sensed.

Another feature of the invention is the fact that the sensing pins and sprocket wheels are able to be disposed closely adjacent one another. The tolerances allowed by the industry relative to spacing between adjacent rows of perforations are sufficiently great that when it is attempted to read the tape an inch or more from the sprocket wheel, there is a possibility that the pins will not enter the holes cleanly but will tear at the edges. In accordance with the present invention, perforation sensing is accomplished from one side of the tape; for instance, the top of the tape in the illustrated embodiment, while feeding is accomplished from under the tape and therefore the sensing pins and the sprocket are disposed on opposite sides of the tape and may be positioned closely adjacent one another. Further, by making the sprocket wheel only as wide as is absolutely essential, the width thereof may be made less than the distance between sensing pins so that the pins may straddle the sprocket. In a practical embodiment of the invention, the center of the sprocket wheel and the center of the sensing pins are separated by approximately only two-tenths of an inch and, as a result, little difficulty is experienced with alignment of pins and perforations.

Another feature of the invention is a second apparatus for detecting when the equipment is no longer supplied with tape. A sensing pin is carried by the bail about two and a half spaces behind the sensing pins of the apparatus so far as direction of movement of the tape is concerned. This distance is not critical and other displacements may be employed so long as the pin contacts normally non-perforated sections of the tape. Since the feed holes and the information holes are aligned perpendicular to the direction of movement of the tape, the fact that this latter sensing pin is located two and one-half spaces behind the other sensing pins insures that it always engages a web portion of the tape. If the mechanism loses tape, this latter pin senses this condition and the position of the pin relative to the bail is sensed by a switch which, when the pin is permitted to follow the bail through its full downward movement, opens the switch and disables the apparatus to discontinue operation thereof. Loss of tape is also sensed by the tight tape roller operating in a direction opposite to that in which it is operated by a tight tape so that if the tape tears internally of the machine and such is not sensed by the tight tape roller, the apparatus is still de-energized.

It is another object of the present invention to provide a dog clutch arrangement for feeding a tape to a tape sensing mechanism which dog clutch employs a detent for maintaining it in a given position between feed cycles and which detent may be withdrawn from engagement with the toothed wheel to permit rapid slewing of the tape.

It is another object of the present invention to provide a latched tape reader in which the tape drive sprocket and perforation sensing pins are located immediately adjacent one another in order to minimize malfunctions due to cumulative errors in the spacing between feed holes in the tape.

It is still another object of the present invention to provide a latched tape reader having a single solenoid or electromagnet which, when energized, initiates both a read and a feed operation.

It is another object of the present invention to provide a latched tape reader having means for sensing when the apparatus is running out of tape.

It is yet another object of the present invention to provide a tape reader having a tight-tape roller which not only senses a tight tape condition but also senses a loss of tape.

It is still another object of the present invention to provide a tape reader having an interconnected tape depressor and tight tape roller in which the apparatus is de-energized if either the tight tape roller or the tape depressor are raised during operation of the apparatus.

It is yet another object of the present invention to provide a latched tape reader which employs easily-fabricated, rugged, and long-lived parts in which wear between relatively movable members is minimized and in which the latching mechanisms for both actuated and unactuated positions of various members are relatively insensitive to vibration and shock.

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a perspective view of the feeding and sensing drive mechanisms;

Figures 1, 3, 4, 5:
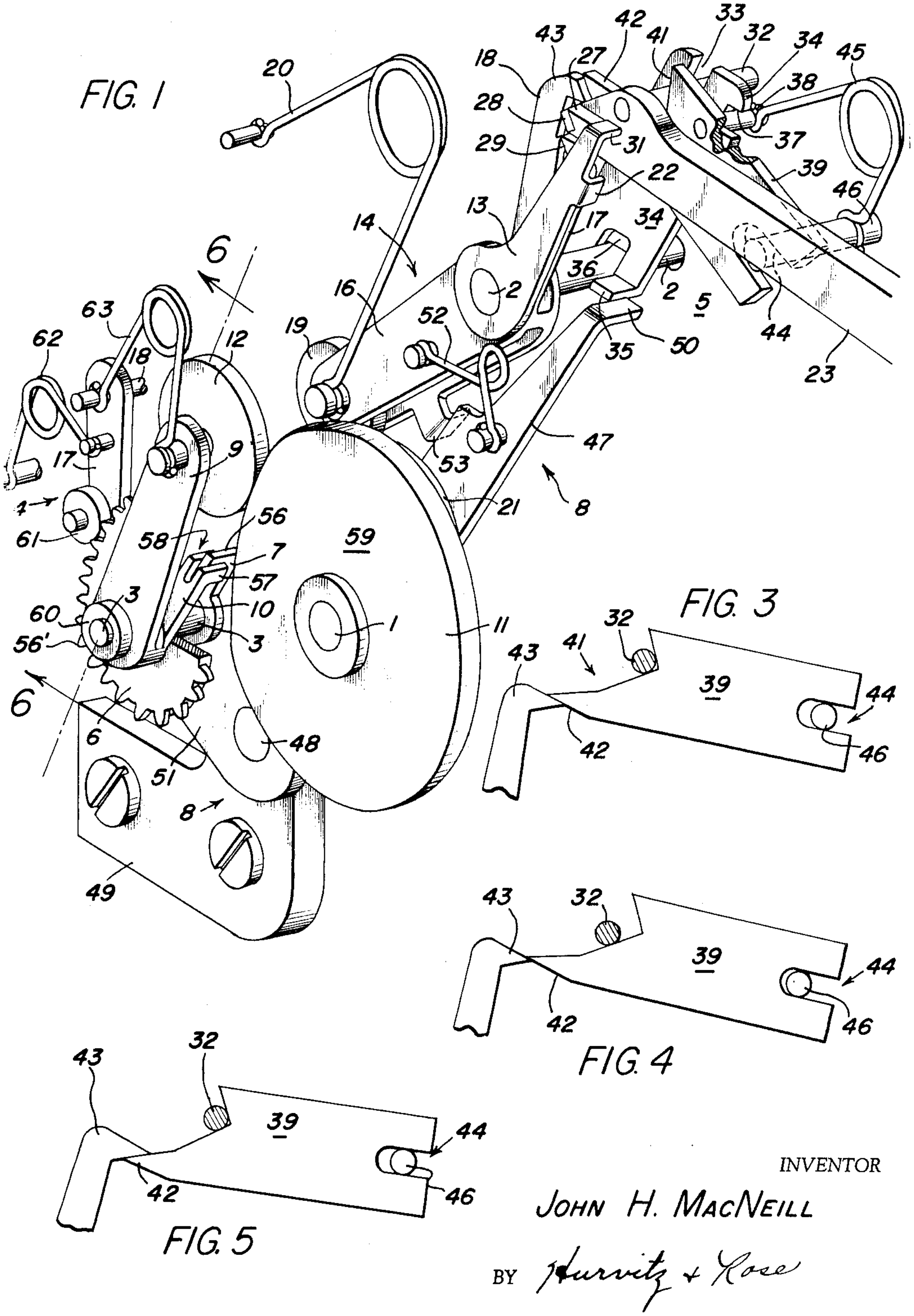
FIGURES 3 through 5 are schematic diagrams of the relative positions during three different intervals of operation of the related latching members of the apparatus.
Figures 2, 10:
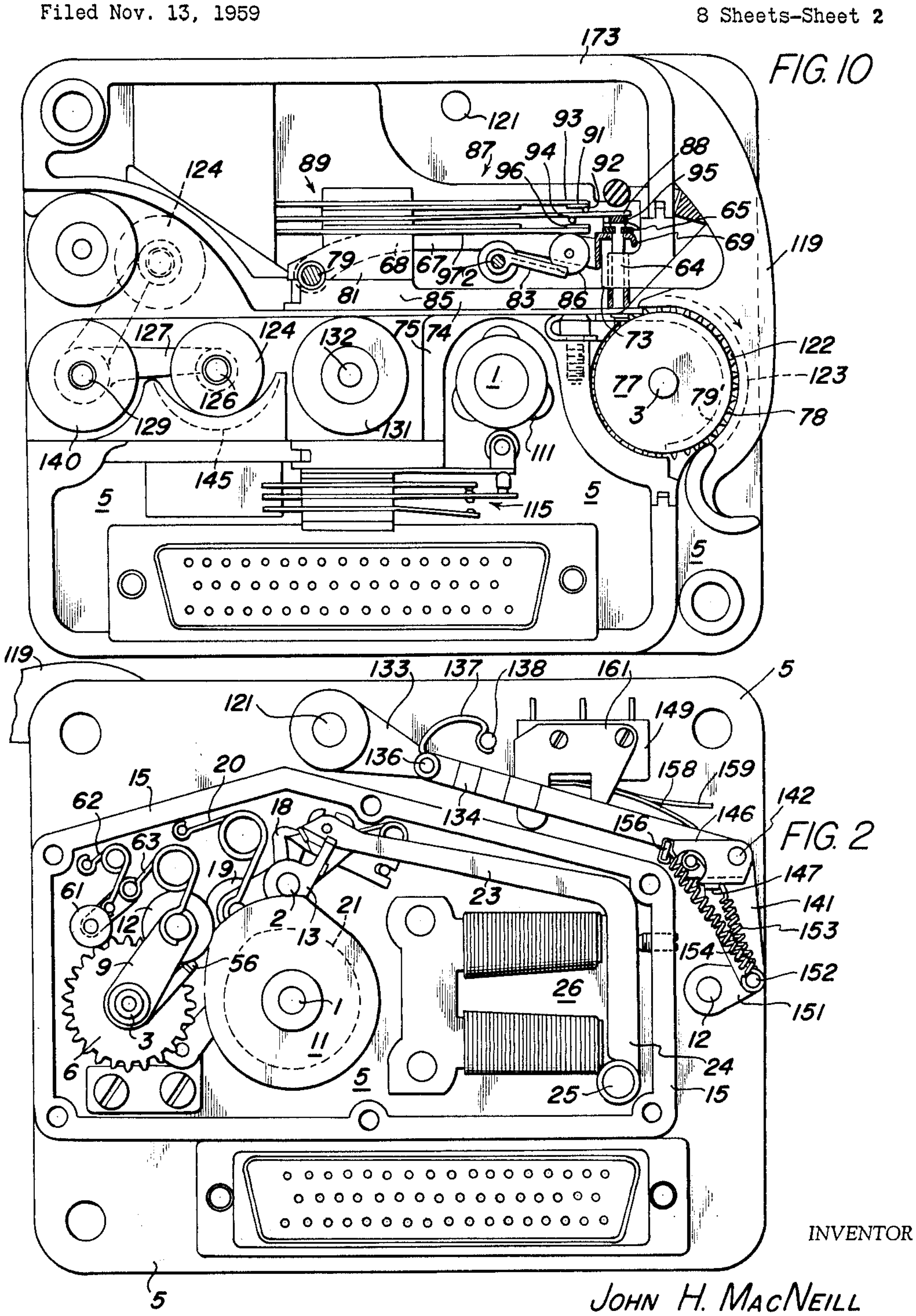
FIGURE 2 is a back view in elevation of the feeding apparatus of the present invention.
FIGURE 10 is a front view in elevation of the sensing apparatus of the present invention.

Referring specifically to FIGURES 1 and 2 of the accompanying drawings, there is illustrated the essential details of the drive mechanism of the apparatus of the present invention which is located on one side of a vertical wall 5 and is enclosed within a continuous wall 15 extending perpendicuar to the wall 5. Of particular importance with respect to the drive mechanism are shafts 1, 2, and 3 all of which are rotatably supported by and pass through the wall 5 into the portion of the housing in which the sensing mechanism is disposed. The shaft 1 is the main drive shaft of the apparatus and controls timing of the various phases of operation and, in addition, supplies the drive energy for a perforated member feed mechanism 4. The feed mechanism 4 includes a toothed wheel 6 of a dog clutch arrangement, the wheel being supported on the shaft 3 so that upon rotation of the toothed wheel 6, the shaft 3 is rotated to produce feed of the perforated member as will be explained subsequently. Rotation of the toothed wheel 6 is effected by insertion of a pawl 7 into the space between adjacent teeth of the wheel 6; insertion of the pawl between these teeth being effected by counterclockwise rotation about shaft 48 of a bell-crank 8 on which the pawl 7 is rotatably supported. Rotation of the pawl 7 to produce movement of the toothed wheel 6 is effected by a cam follower mechanism comprising arms 9 and 10 rigidly connected and rotatably supported on the shaft 3 and rotated thereabout by means of a cam follower 12 rotatably supported on the arm 9 and a cam 11 secured to the main shaft 1. The cam follower 12 is urged into contact with cam 11 through the action of a spring 63 operated against anchor pin 18.

The shaft 2 controls movement of the perforation sensing mechanism of the present invention and more particularly, upon counterclockwise rotation of the shaft 2 relative to its position as illustrated in FIGURE 1 produces such a sensing operation. Counterclockise rotation of the shaft 2 is permitted by an arm 13 while clockwise rotation of the shaft 2 is effected by the arm 13. More particularly, the shaft 2 is biased, by means which will be discussed subsequently, to rotate counterclockwise and therefore the apparatus in the invention is designed to permit the arm 13 to rotate counterclockwise at proper intervals and to effect clockwise rotation of the arm 13 when it is desired to terminate a sensing operation by rotating the shaft 2 clockwise.

The mechanism for controlling movement of the arm 13 comprises a bell crank 14 which is pivoted about the shaft 2 and which comprises a first arm 16 disposed below the shaft 2 and two further arms 17 and 18 disposed above the shaft 2, all as viewed in FIGURE 1. The end of the arm 16 remote from the shaft 2 carries a wheel-type, cam follower 19 which is urged into engagement with a code cam 21, secured to the main shaft 1, by a spring 20. The shape of the cam 21 is illustrated in dashed lines in FIGURE 2. The arm 17 of the bell-crank 14 lies parallel to the arm 13 and the arm 13 is provided with a shoulder 22 disposed immediately behind the arm 17 of the bell-crank 14; that is, immediately to the right of the arm as viewed in the figures under consideration. Thus, when the bell-crank 14 is rotated clockwise about the shaft 2, the shoulder 22 of the arm 13 may engage the arm 17 to effect clockwise rotation of shaft 2. When the bell-crank 14 rotates counterclockwise about the shaft 2, the arm 17 tends to retreat from the arm 13 permitting the arm 13 and shaft 2 to rotate counterclockwise provided other conditions, to be discussed immediately, are acceptable.

Counterclockwise rotation of the arm 13 relative to its position illustrated in FIGURE 1, is controlled by an arm 23 secured, and reference is now made specifically to FIGURE 2 of the drawings, to an armature 24 of a electromagnet or solenoid 26. The armature 24 is pivoted about shaft 25, thereby causing a general downward movement of the arm portion 23 of the armature 24 as illustrated in FIGURE 1. The arm 23 has disposed on its left end a generally rectangular block 27 secured to the side of the arm 23 adjacent the arm 13. Also secured to arm 23 and located slightly below the rectangular block 27 and on the side of the block 27 adjacent arm 13 is a generally triangular block 28 somewhat smaller than the block 27. The arm 17 of the bell-crank 14 is provided with a pointed end or hook 29 directed toward the left as viewed in FIGURES 1 and 2 and when the apparatus is in the position illustrated in FIGURE 1, the hook 29 is disposed under the block 28 on the arm 23. Thus, when the bell-crank 14 is in the position illustrated, the arm 23 cannot be rotated downwardly as a result of energization of a solenoid 26, since the hook 29 is disposed under the block 28 and prevents such movement. Further, when the arm 23 is in the position illustrated, the block 27 prevents counterclockwise rotation of the arm 13 relative to the position illustrated in FIGURE 1, because of a shoulder 31 formed at right angles to and at the upper end of the arm 13. The shoulder 31 abuts the right end of the projection 27 on the arm 23 and so long as the arm 23 is in the position illustrated, counterclockwise rotation of the arm 13 upon counterclockwise rotation of the bell-crank 14 is prevented. Thus, the arm 23 cannot be moved downwardly when the bell-crank 14 is in the position shown and so long as the arm 23 is in the position illustrated, the arm 13 cannot rotate counterclockwise. If, however, the solenoid 26 is energized when the bell-crank 14 is rotated clockwise to the extent necessary to remove the hook portion 29 of the arm 17 from under the block 28, the arm 23 may move downwardly and thereafter when the bell-crank 14 rotates counterclockwise the arm 13 may follow it. Also, when the bellcrank 14 does rotate counterclockwise the hook 29 becomes disposed over the block 28 on the arm 23 and positively retains the arm 23 in its downward position.

In a cycle of operation, the bell-crank 14 starts in the position illustrated in FIGURE 1 and is initially rotated clockwise until the arm 17 engages the shoulder 22 on arm 13 and moves it slightly clockwise to disengage shoulder 31 from bearing on block 27. If the solenoid is energized during this interval, the arm 23 may be moved downwardly since hook 29 or arm 17 is clear of block 28, and thereafter when the arm 14 is rotated counterclockwise to the position illustrated in FIGURE 1 the arm 13 will follow the arm 17 and produce sufficient counterclockwise rotation of the shaft 2 to effect a perforation sensing operation. During this interval, as indicated above, the arm 23 is locked in its downwardmost position by hook 29 and therefore cannot rise until the bell-crank 14 is rotated clockwise to a maximum extent which operation occurs only at the termination of the sensing operation. Thus, regardless of the condition of the solenoid 26 after its initial operation, a complete sensing cycle is effected. After the bell-crank 14 has been rotated clockwise after a sensing operation, the arm 23 may rise since the hook 29 on arm 17 is removed from over the block 28.

An important feature of the invention resides in the fact that all critical surfaces which would normally slide on one another under heavy load are disengaged from one another prior to such sliding movement. Thus, in the portion of the apparatus discussed, the shoulder 31 on the arm 13 is moved out of engagement with block 27 prior to downward movement of the arm 23 as a result of the slight clockwise movement imparted to the arm 13 prior to the hook portion 29 of the arm 17 being withdrawn sufficiently to permit the arm 23 to move downwardly. Further, when arm 23 has been latched down by block 29, the engaging surfaces of 29 and 28 are made to be parallel in an attempt to reduce wear.

As previously indicated, one of the primary objects of the present invention is to insure that each reading operation or read cycle is followed by a feed cycle regardless of the condition of energization of the solenoid 26. In order to insure such operation, the arm 23 carries a stub shaft 32 extending perpendicular to the arm 23 and into a slot 33 formed in the upper surface of a plate 34. The plate 34 is disposed generally parallel to the arms 23 and 13 and therefore is disposed generally perpendicular to the shaft 2. The plate 34 has a vertical slot 36 in its bottom surface and the shaft 2 is disposed therein. The portion of the plate 34 defining the right side of the slot 36 terminates in a shoulder 35 disposed at right angles to the plate. Further, the upper right hand, generally vertical surface of the plate 34 is provided with a notch 37 in which is disposed another stub shaft 38 secured to a plate 39 disposed between the arm 23 and the plate 34 adjacent the upper portion of the plate 34, all as viewed in FIGURE 1. The plate 39 is provided at its left end with a V-shaped slot 41 which slot lies generally on its side and the portion of the plate 39 below the slot 41 is extended toward the left (see FIGURE 3) to form a hook 42 adapted to cooperate, as will be explained subsequently, with a hook 43 formed on the upper end of the arm 18 of the bell-crank 14. It will be noted that the arm 18 is disposed on the side of the arm 23 opposite from the arm 17 of the bell-crank 14 and is aligned with the plate 39. The plate 39 is provided at its right end with a slot 44 in which is disposed a stub shaft 46 secured to the frame of the apparatus. A hair-pin spring 45 is connected between the shafts 38 and 46 so as to urge the shaft 38 and therefore the plate 39 toward the left as illustrated in FIGURE 1.

When the arm 23, the bell-crank 14 and the plate 39 are all in the positions illustrated in FIGURE 1, the stub shaft 32 is disposed at the apex of the V-shaped slot 41 and the bottom of the slot 44 in the plate 39 is spaced to the left, as viewed in FIGURE 3, of the shaft 46. Also, the hook 43 on the arm 18 of the bell-crank 14 is disposed under the hook 42 on the plate 39. Upon downward movement of the arm 23, the stub shaft 32 is forced downwardly but during this interval the hook 43 on the arm 18 is disposed under the plate 39 and therefore the plate cannot move downwardly. As a result, the plate is moved toward the right, as illustrated in FIGURE 4, by an amount determined by the shape of the V-shaped notch 41 and specifically, the bottom of the V. Upon subsequent counterclockwise movement of the bell-crank 14, the hook 43 of the arm 18 is gradually withdrawn from under the hook 42 on the plate 39, and the plate 39 is finally permitted to move abruptly downward, pivoting counterclockwise about shaft 46 and to the left until the shaft 32 is again seated in the apex of the V-shaped groove 41 and the hook 42 is disposed under hook 43 as viewed in FIGURE 5.

The hooks 42 and 43 are so dimensioned that in order for them to be withdrawn sufficiently to become disengaged from one another, the plate 39 must move toward the right and the hook 43 must be moved to the extreme of its stroke to the left, both as viewed in FIGURE 4 and only then can the hook 42 move downwardly. Therefore, the arrangement prevents downward movement of plate 39 in response to vibration and shock since it is highly improbable that the two members would tend to move in opposite directions in response to the same impact.

Further, the plate 39 moves downwardly and the hook 43 becomes generally disposed over the hook 42 when the bell-crank 14 has rotated counterclockwise to the end of its stroke. Since the hook 29 is still disposed over the block 28 on the arm 23, the plate 39 becomes latched into the position illustrated in FIGURE 5 before the arm 23 is permitted to rise. Thus, regardless of the condition of energization of the solenoid 26 at the time the bell-crank 14 is returned counterclockwise to complete a reading operation, the plate 39 is latched into the position illustrated in FIGURE 5 and, as will become apparent, insures the performance of a feed cycle by the apparatus following completion of the reading cycle.

As previously indicated, the plate 39 carries a stub shaft 38 which is disposed in a notch 37 on the plate 34 and therefore, when the plate 39 pivots downwardly in a counterclockwise motion about shaft 46 into the position illustrated in FIGURE 5, the plate 34 is also moved downwardly. The plate 34 is provided at its bottom surface to the right of the notch 36 with the right angle shoulder 35 which extends to the left of the plate as illustrated in FIGURE 1 and it is disposed at right angles thereto. The shoulder 35 is, when the plate 34 is in the position illustrated in FIGURE 1; that is, in its upwardmost position, aligned with an over-turned upper end 50 of one arm 47 of the bell-crank 8. The bell-crank 8 is rotatable about a shaft 48 carried in a support block 49 secured to the housing of the apparatus and is further provided with an arm 51 on which is supported the pawl 7. The arm 47 of the bell-crank 8 is coupled to the arm 16 of the bell-crank 14 by a spring 52 so that when the arm 16 moves away from the arm 47, the arm 47 is constrained to follow it. However, if the shoulder 35 of the plate 34 is disposed in the path of movement of the overturned end 50 of the arm 47 then the arm cannot follow movement of the arm 16 of the bell-crank 14. It will be noted that if the plate 34 is moved downwardly when the shoulders 35 and 50 are in engagement, a heavy load would be imposed on the sliding surfaces and as previously indicated, it is an object of the invention to avoid all such possibilities. Therefore, the arm 16 is provided with a shoulder 53 which is disposed in alignment with the arm 47. When the bell-crank 14 is rotated counterclockwise, the member 53 engages the arm 47 of the bell-crank 8 and imparts a slight clockwise movement to it prior to disengagement of the hook 43 from the hook 42. In consequence, the shoulder 50 is removed from engagement with the shoulder 35 just prior to the time when the plate 34 moves downwardly and therefore, contact between these two members during movement of the plate 34 is prevented.

After downward movement of the plate 34, the bell-crank 14 is rotated clockwise by the code cam 21 and the arm 47 is permitted to follow the arm 16 through the action of spring 52, and rotates counterclockwise about its shaft 48. As previously indicated, the pawl 7 is rotatably secured to the arm 51 of the bell-crank 8 and more particularly, and reference is now made to FIGURE 6 of the accompanying drawing, the pawl 7 is rotatably disposed on a hollow stub shaft 54 seated within an aperture 55 in the arm 51. The stub shaft 54 is disposed about the shaft 3 which shaft extends through a hollow end shaft 60 which is secured to the housing of the apparatus and to which the cam follower arm 9 is rotatably secured. The toothed wheel 6 of the dog clutch is fixedly secured to the shaft 3. Conventional means, such as a hubbed surface and snap ring, not shown, are employed to maintain the lateral position of bearing shaft 60 with respect to toothed wheel 6.

Figures 6, 14, 15:
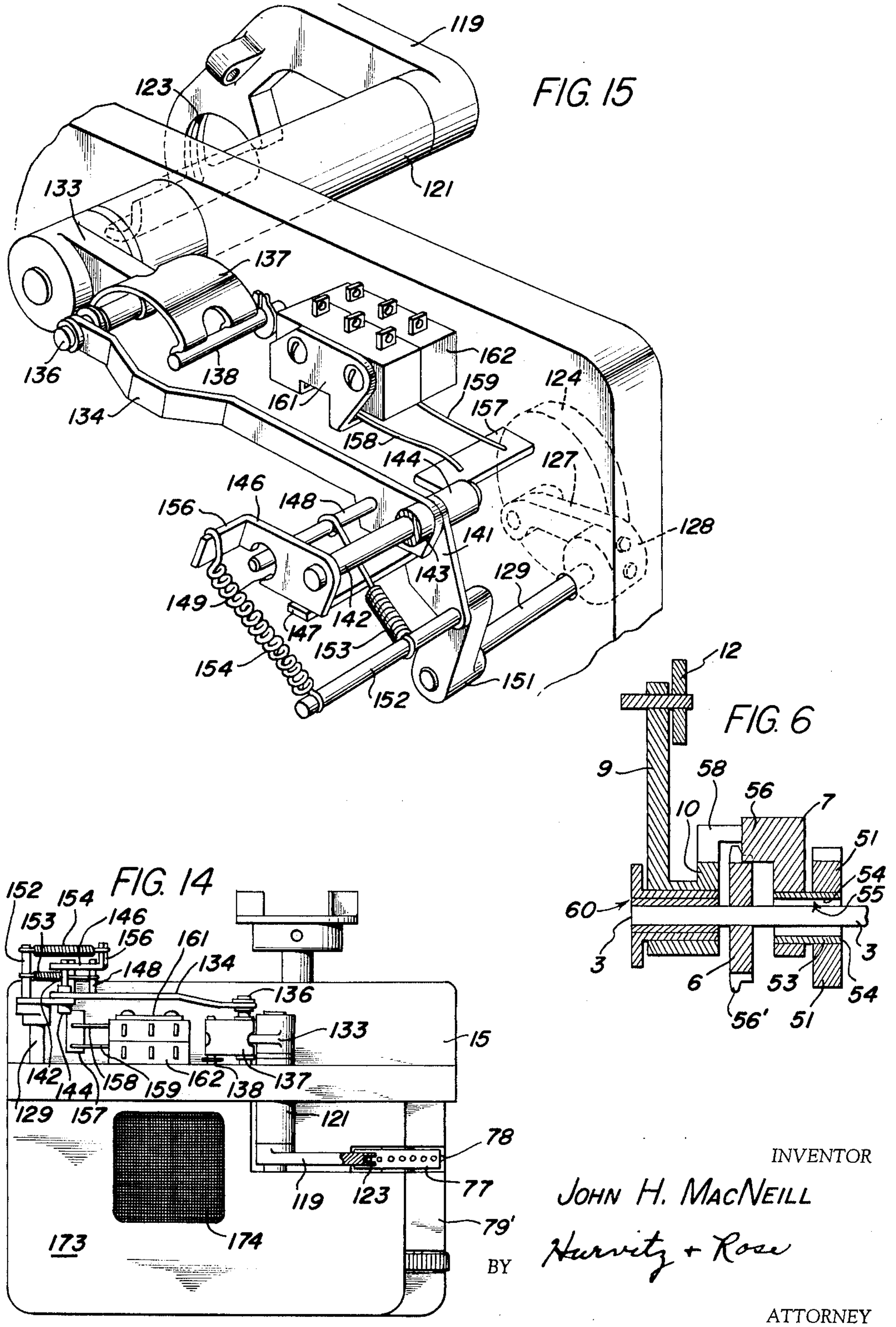
FIGURE 6 is a cross sectional view in elevation of a portion of a feed mechanism of the present invention.
FIGURE 14 is a top view of the apparatus of the invention.
FIGURE 15 is a perspective view in elevation of the interconnection between the tape depressor and the no-tape, tight-tape sensing mechanism.

The pawl 7 has a right angle portion 56 extending over the toothed wheel 6 and is disposed between two arms 57 and 58 which form an upstanding forked end of the arm 10 which may be integral with the cam follower arm 9. The fingers 57 and 58 also extend over the top of the toothed wheel 6 and therefore are disposed on opposite sides of the portion 56 of the pawl 7 and provide a sliding guide thereto. The portion 56 of the pawl 7 has a vertical cross section taken perpendicular to the illustration of FIGURE 6, the width of which is equal to the width between the teeth on the toothed wheel 6 and when the bell-crank 8 is rotated counterclockwise, the portion 56 of the pawl 7 is seated between two adjacent teeth of the toothed wheel 6. Upon this occurrence, the assembly comprising pawl 7 and the hollow stub shaft 54, move downwardly as illustrated in FIGURE 6 and become centered approximately on the longitudinal center line of the shaft 3; or more particularly the axis of the hollow stub shaft 54 becomes coaxial with the axis of the shaft 3. Thereafter, upon the engagement of the cam follower wheel 12 with a raised portion 59 of the feed cam 11, the arms 9 and 10 rotate counterclockwise, as illustrated in FIGURE 1, and rotate, the pawl 7 therewith about stub shaft 54. Rotation of the pawl 7 imparts rotation to the toothed wheel 6 since the portion 56 of the pawl 7 is disposed between the teeth of the wheel. The arms 9 and 10 are maintained in this counterclockwise position for a length of time determined by the length of the raised portion 59 of the cam 11 and the speed of rotation of the main shaft 1. During the interval which follows rotation of toothed wheel 6, the bell-crank 14 is rotated counterclockwise. During this action, the shoulder 53 continually engages the arm 47 of the bell-crank 8, rotating it clockwise so as to return the pawl 7 to the disengaged position illustrated in FIGURE 6 and therefore withdrawing the portion 56 from between teeth on the toothed wheel 6. Thereafter, the cam follower arms 9 and 10 may be returned to their clockwise position without affecting the position of the toothed wheel 6 since the pawl 7 has been withdrawn from between the teeth. The position of the toothed wheel is maintained, intermediate feeding operations by a detent 61 which is biased into engagement with the teeth of the toothed wheel 6 by a spring 62. To insure effective non-ambiguous detent action, a portion of the width of sprocket teeth 56' engaged by the detent 61, are leveled. The remaining portion of the width of the teeth 56' is rectangular and flat-topped and is disposed in the region engaged by the feed pawl 56. The flat-topped portion of the teeth permit disengaging a minimum of displacement for insertion of feed pawl 7 by bell-crank 8.

Figure 7:
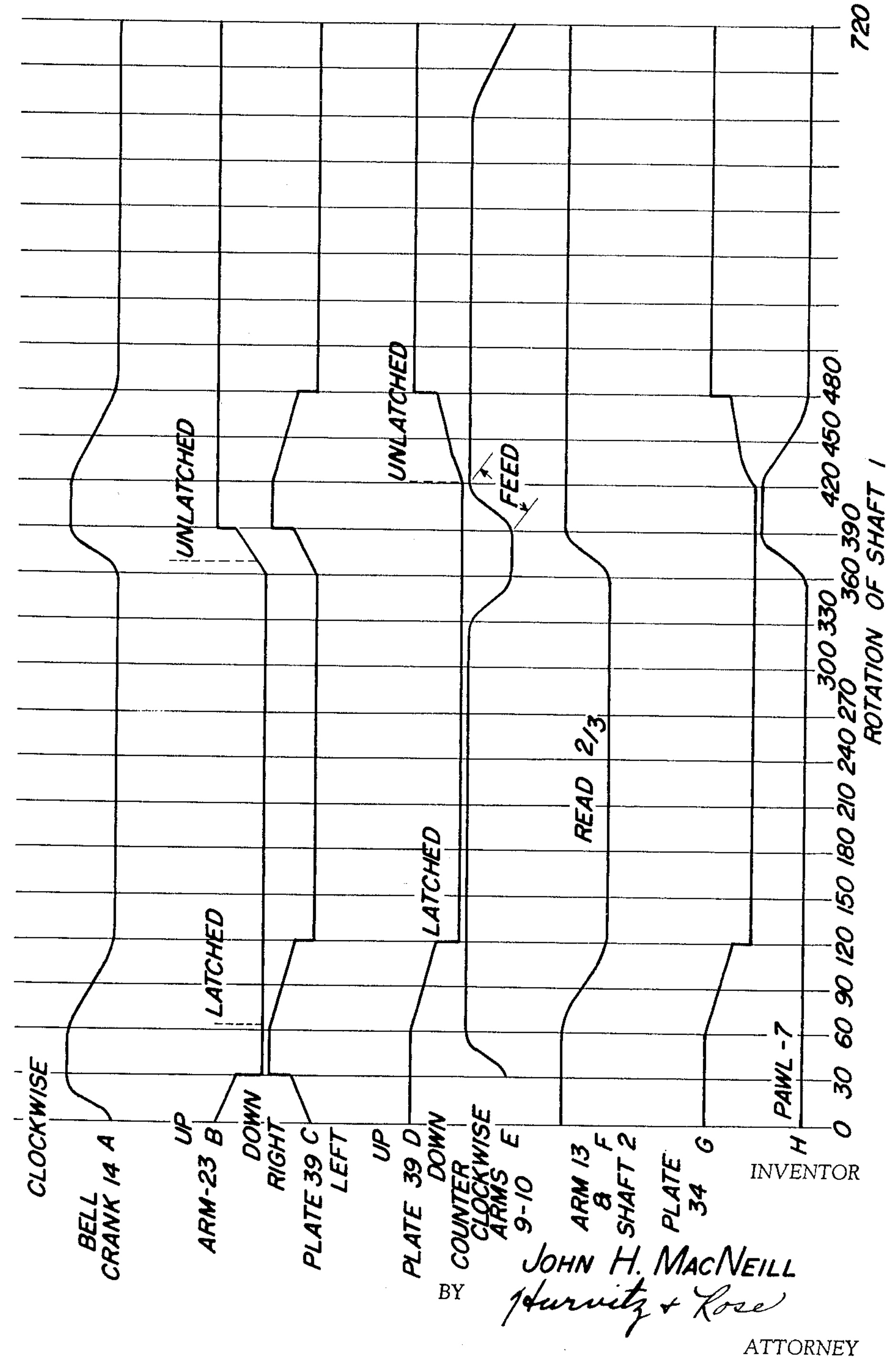
FIGURES 7 and 8 are graphs of the timing functions of the apparatus of the present invention.

Proceeding now to a description of a complete cycle of operation of the drive mechanism of the apparatus of the invention, and reference is made to the timing diagrams of FIGURE 7, initially the apparatus is in the position illustrated in FIGURE 1; that is, with the bell-crank 14 near its counterclockwise position, the arm 13 and therefore the shaft 2 in their clockwise position, the armature 23 in its upward position, the arms 9 and 10 in their clockwise position, and the plate 39 in its upper left position. At the beginning of the cycle, the cam follower 19 engages a raised portion on the code cam 21 and the bell-crank 14 (see graph A) is rotated clockwise through the first 30° of rotation of the shaft 1. If the solenoid 26 is energized, the arm 23 (see graph B) begins to move downward gradually, due to engagement of the surface of the hook 29 and the upwardly sloping surface of the block 28. At the end of the first 30° of rotation of the shaft 1 when the bell crank 14 is near its maximum clockwise position, the hook 29 has become withdrawn from under the block 28 and the arm 23 moves rapidly downward. During this same first 30° of rotation of the shaft 1, the stub shaft 32 attached to the armature 23 is moved downwardly and therefore the plate 39 (graph C) is moved to the right.

During the next 30° of rotation of the shaft 1 all elements of the apparatus remain stationary except the arms 9 and 10 of the feed cam follower mechanism and these arms are rotated counterclockwise due to engagement of the cam follower 12 with the cam surface 59 on the feed cam 11 secured to the shaft 1. The pawl 7 has not been inserted between the fingers of the arm 10 and feed does not occur.

During the next 30° of rotation; that is, from 60° to 90° of rotation of the shaft 1, the bell-crank 14 begins to rotate counterclockwise and after about 5° of rotation of the shaft 1, the hook 29 becomes disposed over the block 28 and the arm 23 is latched in its downward position and therefore it is only necessary for the solenoid 26 to remain energized until the shaft 1 is rotated through its first 65° to insure a reading and feeding operation. During this interval; that is, from 60° to 90° of rotation of shaft 1, the bell crank 14 begins to move the hook portion 43 of the arm 18 of the bell crank from under the hook 42 on the plate 39 and therefore the plate 39 moves downwardly (graph D) and to the left (graph C). This movement continues until the bell crank 14 has reached its counterclockwisemost position which occurs at 120° rotation of the shaft 1 at which time the hook 42 is momentarily freed from the hook 43 and the plate 39 moves rapidly downward and to the left so that the hook 42 is now disposed under the hook 43. The plate 34 (graph C) is connected to plate 39 by shaft 38 and therefore moves downwardly with it during the interval from 60° to 90° of rotation of shaft 1. Also during the interval from 60° to 120°, the arm 13 follows the arm 17 of the bell crank 14, since the arm 23 is in its downward position, and in consequence the shaft 2 is permitted to rotate counterclockwise and reaches its counterclockwise limit of rotation at 120° rotation of the shaft 1. When the shaft 2 is rotated to its counterclockwise position, a reading cycle is initiated and this cycle continues from 120° to 360° of rotation of the shaft 1.

At 330° of rotation of the shaft 1, the portion 59 of the feed cam 11 terminates and the arms 9 and 10 rotate to their clockwise position through the interval from 330° to 360° of rotation of the cam. During the next 30° of rotation of the shaft 1, the bell crank 14 rotates clockwise terminating the reading cycle. Since the plate 34 (see graph G) is in its downward position, the bell crank 8 is permitted to rotate counterclockwise to insert the pawl 7 between the teeth on the toothed wheel. (See graph H.) During this same interval; that is, from 360° to 390° of rotation of the shaft 1, if the solenoid 26 is de-energized, the armature 23 rises and consequently the plate 39 is shifted again to the right. The plate 39 cannot rise since the bell crank is rotated clockwise during this interval and the hook 43 is disposed over the hook 42 on the plate 39. During the next 30° interval from 390° to 420° of rotation of the shaft 1, the arms 9 and 10 are again rotated counterclockwise and since the pawl 7 is now disposed between the teeth of the toothed wheel 6, a feed operation is performed, this being the only operation during this interval.

During rotation of the shaft 1 from 420° to 480° the bell crank 14 rotates counterclockwise thereby rotating the bell crank 8 clockwise and withdrawing the pawl 7 from between the teeth of the toothed wheel 6. Also, since the arm 23 has risen and the arm 18 carrying the hook 43 is rotated counterclockwise with the bell crank 14, the hook 43 is removed at the end of this interval from over the hook 42 and the plate 39 and therefore plate 34 return to their upper positions and the plate 39 returns to its leftmost position. Since the armature 23 returned to its upwardmost position during the interval from 360° to 390° of rotation of the shaft 1, when the bell crank 14 rotates counterclockwise from 420° to 480° of rotation of the shaft 1, the arm 13 is prevented from rotating counterclockwise with the bell crank 14 and an additional read operation is prevented. The apparatus continues in the positions illustrated in FIGURE 7 until the shaft has obtained 660° of rotation and during the interval between 690° and 720° of rotation, the arms 9 and 10 are turned to their clockwise positions.

It will be noted that so long as the solenoid 26 is energized for the interval from 30° to 65° of rotation of the shaft 1, a complete cycle of operation of the apparatus is effected since the arm 23 is latched at 65° of rotation of the shaft and once the arm is latched in its downward position, read and feed cycles must follow so long as the shaft 1 is rotated. Also, it will be noted that the read cycle takes place from approximately 120° to 360° of rotation of the shaft 1 and therefore a full two-thirds of the cycle of angular rotation of the shaft 1 is allotted to reading and in consequence, minimum danger is experienced as a result of bounce of the sensing pins, or the switches which sense the positions of the sensing pins. If, in a practical embodiment of the invention, the shaft 1 is rotated at 60 cycles per second, then 11 milliseconds are allotted to a perforation sensing operation.

A reference to FIGURE 7 makes it readily apparent that the apparatus may be operated in a reverse direction without disturbing the cycle of operation. The diagrams of FIGURE 7 are read from right to left and the latched and unlatched positions are interchanged. The feed occurs from 60° to 30° of rotation and it will be noted that the arms 9–10 rotate in a clockwise direction which is the reverse of the operation described above. A read cycle is performed from 360° to 120° of rotation and therefore takes place before the feed cycle. Thus, exactly the same order of read and feed and latching and unlatching occurs regardless of the direction of feed.

It is not intended to limit the duration of the intervals of various functions to those illustrated in FIGURE 7 and subsequently in FIGURE 8. The various intervals employed are functions of the speed of the apparatus. As the speed for which the mechanism is designed is increased, the movements to which the components are subjected must be extended are longer periods to prevent serious increases in acceleration. If the acceleration is increased too severely, extremely heavy springs would be required to maintain the cam followers in contact with the cams, and also to maintain other members in their proper positions. The heavy loads thus imposed on the elements would greatly reduce their expected life. To avoid such problems, the extended period permitted for a reading cycle is reduced, and the addition cycle time is allotted to other functions so as to reduce the accelerations imposed on various operating members.

As previously indicated, the operation of the mechanism is different when the solenoid 26 is intermittently energized than when it is continuously energized. The cycle of operation just described depends upon intermittent energization of the solenoid 26 with energization terminating at least prior to 360° of rotation of the shaft.

Figure 8:
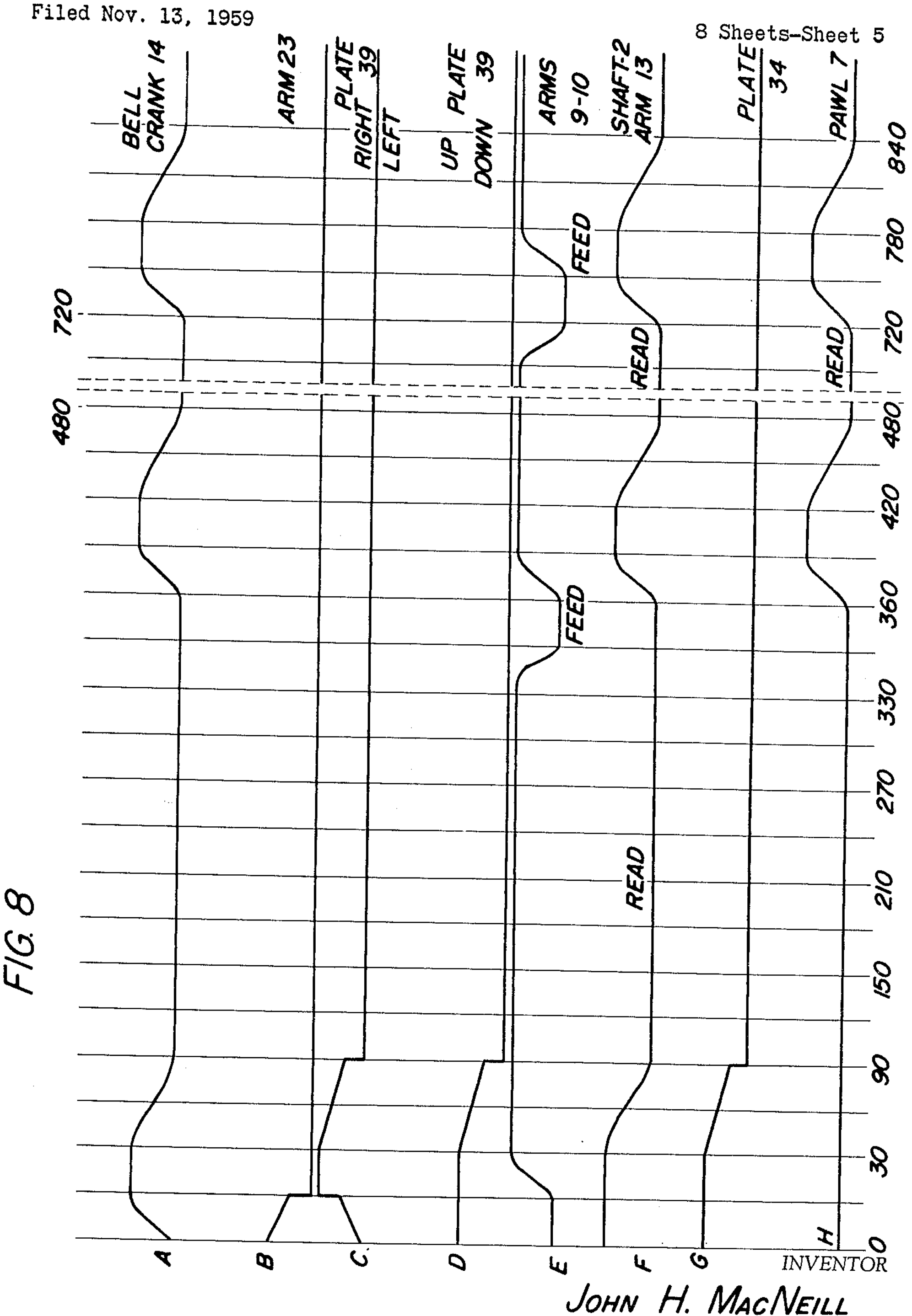

Referring now to FIGURE 8 of the accompanying drawings, there is illustrated a cycle of operation which depends upon continuous energization of the solenoid 26. It will be noted that during the first 360° of rotation of the shaft 1, the operation of the apparatus, as indicated by the timing graphs of FIGURE 8, is identical with the operation indicated by FIGURE 7. However, during the interval from 360° to 390° of rotation of the shaft 1, the arm 23 does not return to its upwardmost position since the solenoid 26 is energized and therefore the arm 23 remains in its downward position throughout the complete cycle of operation of the apparatus. Also, the plates 39 and 34 do not return to their upward position but remain in their downward position.

Since the arm 23 remains in its downward position, the next counterclockwise rotation of the bell crank 14 effects a second read cycle, this occurring during the interval from 480° to 720° of rotation of the shaft 1. During the interval from 720° to 750° of rotation, since the plates 39 and 34 remain in their downwardmost position, the pawl 7 is inserted between the teeth on the toothed wheel 6 and when the arms 9 and 10 are again rotated counterclockwise a feed operation is initiated.

It is seen therefore, that when the system is operated with the solenoid 26 energized continuously, two read and two feed cycles are effected for each two cycles of rotation of the shaft 1.

Figure 9:
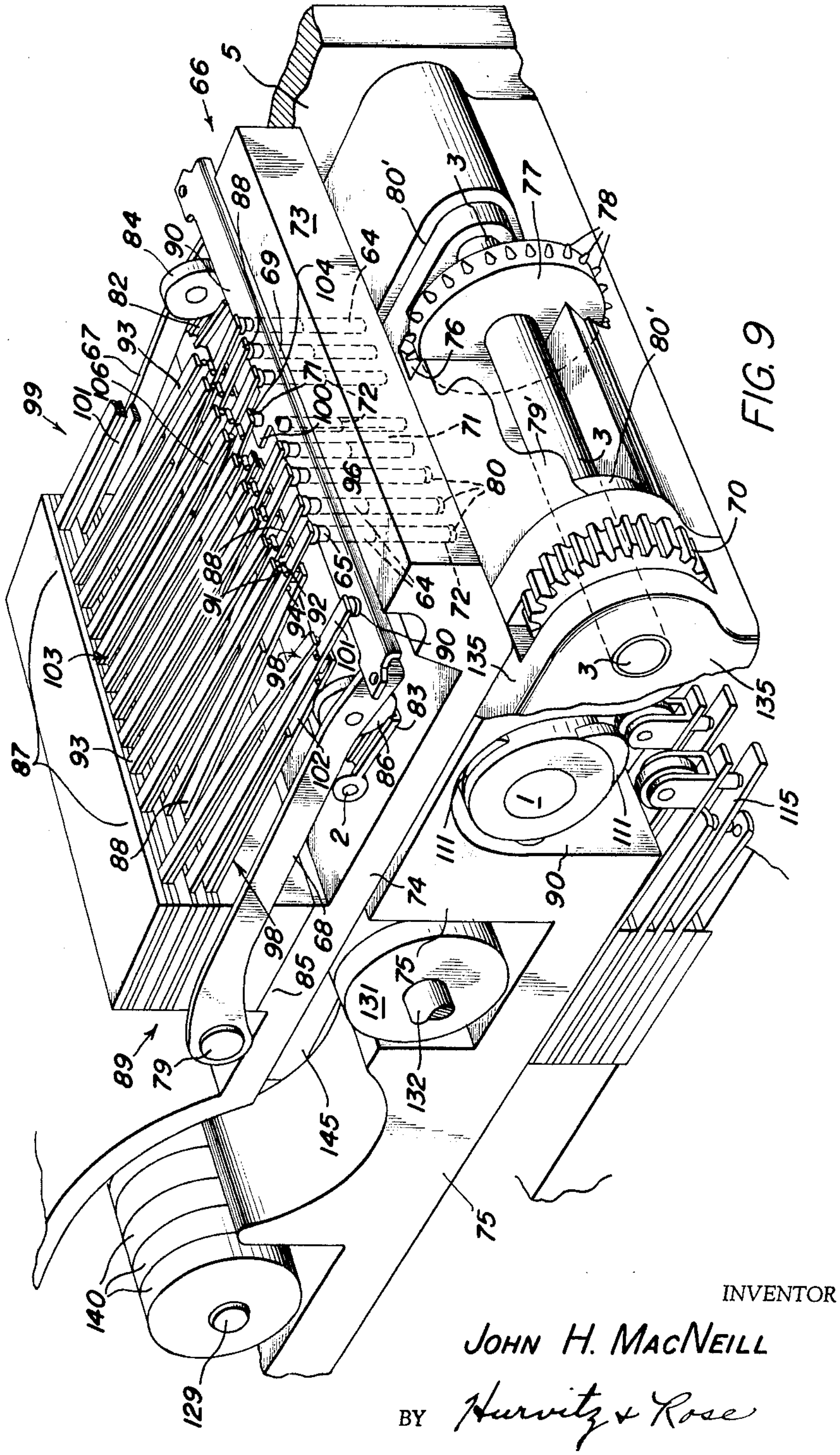
FIGURE 9 is a perspective view of the sensing apparatus of the present invention.

Referring now specifically to FIGURES 9 and 10 of the accompanying drawings which illustrate the sensing mechanism of the present invention, there is provided a plurality of sensing pins 64 disposed perpendicular to the direction of travel of a perforated member to be sensed by the mechanism (not shown). The pins have head portions 65 and the number of pins 64 is normally equal to the number of information holes per column employed in a particular code, and tapes are in common usage today employing 5, 6, 7, 8 and 16 hole codes. An apparatus employing eight pins, this being the number illustrated in the accompanying drawings, can accommodate tapes employing any number of information perforations up to 8 per code. Therefore, an apparatus employing eight sensing pins may be selectively scheduled to accommodate any of these varying numbers of perforations per hole. The sensing pins 64 are supported in a base member 69 of a bail generally designated by the reference numeral 66. The bail is generally U-shaped and comprises a pair of arms 67 and 68 interconnected by the base member 69. The base member 69 of the bail 66 is arranged perpendicular to the direction of travel of the member to be sensed and the punch pins 64 are arranged in a row of apertures along the base member 69 with the heads 65 of the pins 64 engaging the upper surface of the base 69. The base 69 carries a further sensing pin 71 employed to sense the presence or absence of tape and this function will be described in greater detail subsequently.

The lower ends of the sensing pins 64 are received in apertures 72 in a guide block 73 which forms a portion of a plate 74 secured to the wall 5. The front wall of the plate 74 is deleted from FIGURE 9 to permit a clear view of the structure. The plate 74 is disposed immediately above the path of the perforated member to be sensed and provides an upper guide surface for the member. A lower guide for the perforated member is provided by a solid body 75 disposed below the plate 74 by an amount sufficient to allow free passage of the tape and is formed integrally with the wall 5 and together with the wall 5 forms the main body of the apparatus. The member 75 is provided with a row of transverse apertures 80 aligned with those in guide 73 so the pins 64 may pass through the perforated member a sufficient distance to sense such an occurrence. The right end of the member 75 is recessed at 76 to receive a sprocket wheel 77 secured to the shaft 3 which is an extension of the shaft 3 illustrated in FIGURE 1. The upper surface of the sprocket wheel 77 is substantially flush with the upper surface of the member 75 and the sprocket wheel 77 carries a plurality of pins 78 which are adapted to enter feed holes in a perforated member and therefore upon rotation of the sprocket 77, in response to rotation of the shaft 3, the perforated member is advanced toward the right as viewed in FIGURE 9.

A stripper plate 79′ is bolted to the body 75 a short distance to the left of the sprocekt 77 and extends to the right along an arcuate path conforming generally to the radius of curvature of the sprocket. The plate covers the recess 76 and is seated in grooves 80′ along the vertical edges of the recess. The shaft 3 also carries a gear 70 which may be rotated by hand so as to facilitate manual positioning of tapes in the apparatus. It should be noted that the illustrations of FIGURES 1 and 9, being from opposite sides of wall 5, are reversed with respect to one another in that counterclockwise rotation of the shaft 3 in FIGURE 1 corresponds to clockwise rotation of the shaft 3 as illustrated in FIGURE 8.

The bail 66 is supported on stub shafts 79, only one being shown in FIGURE 9, which are attached to a contact support block 81 secured to a raised platform 85 on the upper surface of the plate 74 at a predetermined distance from the guide block 73. The arms 67 and 68 of the bail 66 are rotatably secured to the shafts 79 so that the bail 69 may rotate about the center line of the shaft 79. The arms 67 and 68 are of such length relative to the angular movement of the bail 66 that substantially a vertical translatory motion is imparted to the base 69 of the bail 66 and therefore to the pins 64.

The angular position of the base 69 of the bail 66 relative to the body 75, is determined primarily by the angular position of the shaft 2 and more particularly the shaft 2 carries two elongated U-shaped troughs 82 and 83 which are fixably secured to the shaft 2 adjacent the arms 67 and 68 of the bail 66. The bail 66 is provided with two rollers 84 and 86 with the former rotatably secured to the arm 67 adjacent the base 69 and the roller 86 secured to the arm 68 in a similar position as the roller 84 adjacent to the base 69. The rollers 84 and 86 rest in the channels formed by the U-shaped members 82 and 83 so that upon rotation of the shaft 2 either clockwise or counterclockwise the rollers and therefore the bail 66 are caused to rise or fall with the rotation of the shaft 2. When the apparatus is in the position illustrated in FIGURE 1, the bail 66 is in the position illustrated in FIGURE 9 with the bottoms of the punch pins 64 disposed above the bottom surface of the plate 74 so that they do not interfere with movement of the perforated member in response to rotation of the sprocket 77. Upon clockwise rotation of the shaft 2 in FIGURE 9 downward movement of the channel or U-shaped members 82 and 83 is produced thereby permitting downward movement of the base 69 of the bail 66. If a particular pin 64 is disposed above an aperture in the perforated member the head of the pin 65 remains in contact with the base member 69 of the bail 66. However, if the pin encounters a web portion of the member to be sensed, the head of the pin 64 rises out of contact with the base member 69, this condition being indicative of a lack of a hole whereas the condition when the head 65 remains in contact with the base 69 is indicative of the occurrence of a hole in that particular position of the tape.

In order to sense the movement of the pins 64 relative to the base 69 of the bail 66, there is provided a plurality of switches generally designated by the reference numeral 87, there being one such switch for each of the sensing pins 64. Each of the switches 87 comprises a resilient leaf spring member 88 which is secured at one end between laminae 89 of insulation disposed on top of and secured to the block 81. The right end of the leaf spring member 88 engages the head 65 of a sensing pin 64, and exerts a downward force on the pin which maintains the head 65 in engagement with the base 69 of the bail 66 except when the pin engages a web portion of the member to be sensed. The leaf spring member 88 carries a cylindrical piece of wire 91 which is adapted to engage at right angles one or more cylindrical wires 92 secured to the underside of a contact member 93 disposed above the leaf spring contact 88 and having its left end secured between laminae 89. The leaf spring contact 88 carries a second piece of cylindrical wire 94 disposed on its under surface, the wire being adapted to engage one or more further cylindrical contacts 96 disposed on the upper surface of a lower contact member 97. The contact 97 is also secured between laminae 89 of the insulation stack.

The wire contact 91 of leaf spring 88 is normally in engagement with the bar contact 92 on the member 93 but upon downward movement of the bail 66 and passage of its associated pin 64 through an aperture in the member to be sensed, the leaf spring contact 88 moves downwardly and the wire contact 94 engages the contact 96 of the contact member 97 thereby closing this set of contacts and opening the contact between the leaf spring contact 88 and the upper stationary contact 93. If, however, the pin 64 does not sense an aperture but engages a web portion of the perforated member, the leaf spring contact 88 remains in engagement with the upper contact member 93 due to the fact that the pin 64 does not move downwardly to the same extent as it does when it senses an aperture.

Two common switches are employed for sensing movement of the bail 66 during operation of the apparatus. These contacts are employed in the external circuit to indicate that an operation has taken place and to gate information developed by the switches 87 to external loads. The common switches, which are designated by reference numerals 98 and 99, are disposed on opposite sides of the switches 87 and each employs a leaf spring contact 101 electrically isolated from and normally in mechanical engagement with the base 69 of the bail 66 and a stationary contact 102 disposed immediately below the leaf spring contact 101. The contacts 101 and 102 are normally out of engagement with one another but upon downward movement of the bail 66, the contact 101 engages the stationary contact 102 and completes an external electric circuit which is indicative of proper functioning of the apparatus. The contacts 101 are electrically insulated from the bail 66 by small cylinders 90 of insulating material disposed in apertures in the base 69. The leaf spring contacts may be insulated from the sensing pins 64 by pieces of insulation 95 secured to the tops of the heads 65 of the pins 64.

As previously indicated, a sensing pin 71 is employed to sense the presence of a perforated member to be sensed. The pin 71 is transversely aligned with the feed holes of the perforated member and is carried by a rearward extension 100 of base 69 behind or to the left, as viewed in FIGURE 9, of the sensing pins 64 by a distance in this specific embodiment equal to two and one-half times the spacing between the columns in the direction of movement of the tape. Thus, the pin 71 is always in a position such that it does not engage an area of the tape having perforations therein. In consequence, upon each downward movement of the bail 66, the pin 71 engages a web portion of a member to be sensed and is raised with respect to the base 69. However, if a perforated member is not in the apparatus or is not in the region of the sensing pins 64, the pin 71 does not engage a tape and therefore its head is maintained in contact with the base 69 of the bail 66. A switch 103 is provided to sense the position of the pin 71 and comprises a movable leaf spring member 104, in engagement with the head of the pin 71, and an upper stationary contact member 106. The contact 104 is normally in engagement with the contact 106 and when a perforated member is in the mechanism, it is maintained in engagement with contact 106. However, if a perforated member is not in the region of the sensing pins 64, the pin 71 falls with the bail 66 and the contact 104 becomes disengaged from the contact 106. The opening of the contacts 104 and 106 may be sensed by an external mechanism to indicate the lack of a tape and may be employed to shut down the apparatus.

Figure 11:
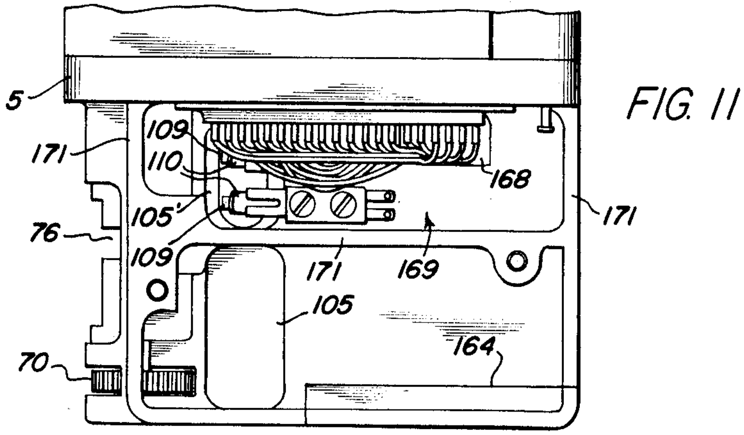
FIGURE 11 is a bottom view of the main housing of the apparatus.

As is apparent from the description of operation of the drive mechanism relative to FIGURES 1 through 9, the main shaft 1 provides the basic timing for the cyclic operation of the mechanism and therefore may be employed to control external cycling of the information received from the apparatus of the invention. Thus, if desired, the feed of information to the solenoid or electromagnet 26 may be synchronized by means of cams on the timing shaft 1 as may other functions of the apparatus. The utilization of timing cams on the shaft 1 further permits the reader to convert the parallel code, read from the perforated member by the pins 64, to a serial code for insertion in serial equipment. More particularly, since all the sensing pins 64 move downwardly concurrently, the information sensed by the switches 87 is read out at the same time; that is, in parallel form. If it is desired to convert this information into serial form; that is, to read out the information from the various switches 87, sequentially and successively, cams may be provided on the shaft 1 and switches may be associated therewith so that each of the switches 87 is connected in a single output circuit during a distinct interval. Referring again to FIGURE 9 and also to FIGURE 11, the timing shaft 1 passes through recesses 105 and 105′ in the bottom of the body 75 which forms the lower guide for the perforated member. The shaft 1 is provided with a plurality of cams such as cams 109 which are located on the portion of shaft 1 disposed in recess 105′ and are adapted to cooperate with switches 110 in order to provide basic timing signals for the external control circuitry. If switches are to be employed to serialize the output code, additional cams 111, eight in number in the illustrated embodiment, are provided on the shaft 1 within the recess 105. Each of the eight cams 111 cooperates with a different one of a plurality of switches 115 secured to the bottom of the body 75. The eight cams 111 encompass an angle equal to no more than $360°/n$ of the angular rotation of the shaft 1 during the interval that the bail 66 is in its reading or downward position; $n$ being the number of code characters. The switches 115 are connected in series with different ones of switches 87 so that each of the switches 87 is connected to a common external circuit during a fraction of each read cycle, thereby providing a serial output. When required, both synchronizing or timing cams 109 as well as serializing cams 111 may be provided.

Figure 12:
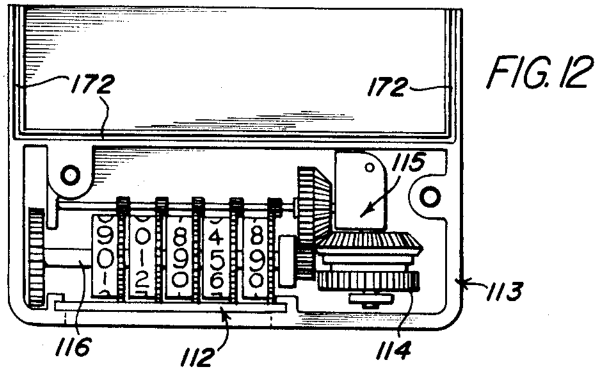
FIGURE 12 is a top view of the counter mechanism.
Figure 21:
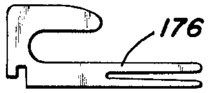
FIGURE 21 is a side view of a tape guide clip.

As previously indicated, it is an object of the present invention to provide the apparatus with a mechanical counter so that the position of the perforated member being sensed may be apparent instantly. In order to accommodate such a counter, and reference is now made to FIGURES 11 and 12, a Veeder-Root counter 112 is enclosed within a housing 113 which is adapted to be secured under the body 75 and form the bottom closure for the reader housing. The counter 112 has a shaft 116 coupled through suitable gearing 115 to a gear 114 which, when the housing 113 is turned over and around and secured to the bottom of the member 75, meshes with the gear 70. Consequently, upon each incremental rotation of the shaft 3 which effects advance of the perforated member, another count is added to the counter 112. Therefore, the counter indicates at all times, the number of characters that have been read by the apparatus. It should be noted that when the counter 112 is employed the switches 115 must be removed since they occupy a portion of the space required by the counter.

The counter 112 has particular importance in the reading mechanism of the present invention, in view of the fact that provision is made for slewing the tape either forward or backward through the mechanism. It will be noted, and reference is made again to FIGURES 1 and 6 of the accompanying drawings, that in consequence of the utilization of the dog clutch mechanism comprising the toothed wheel 6 and the pawl 7, during non-drive intervals the pawl 7 is completely disengaged from the wheel 6 and except for the detent 61 there is no restraining force on the toothed wheel 6. Therefore, by simply moving the detent 61 out of engagement with the toothed wheel 6, the toothed wheel and the sprocket 77 are freely rotatable and the perforated member may be safely pulled in one direction or the other through the mechanism without producing undue strain on the material around the feed holes. This feature of the invention permits the tape to be rapidly advanced or retracted in response to external conditioning of the system and therefore provides a high degree of flexibility in the system. In order to move the detent 61 out of engagement with the toothed wheel 6, a small rotary solenoid may be employed. The detent 61 is carried on a plate 17 secured to a shaft 18. If the shaft 18 is the shaft of a rotary solenoid than by simply energizing the solenoid, the detent 61 may be withdrawn from the toothed wheel 6. When de-energized, the rotary solenoid serves as a bearing for the pivoting plate 17 thereby permitting detent roller 61 to provide the requisite detenting action.

Since the mechanical counter 112 is connected to the shaft 3, it indicates at all times the position of the tape in the machine regardless of how it has been transported.

Referring now specifically to FIGURES 2, 10 and 14, there is provided a tape depressor 119 pivoted about a shaft 121. The tape depressor 119 has an arcuate portion 122 which surrounds a predetermined portion of the sprocket 77 and is provided (see FIGURE 11) with a slot 123 through which the pins 78 may proceed. The tape depressor 119 is a conventional apparatus being employed to maintain the tape in firm contact with the sprocket wheel 77 so as to insure that the teeth 78 of the sprocket are maintained in the feed holes in the perforated member to be fed.

Figure 13:
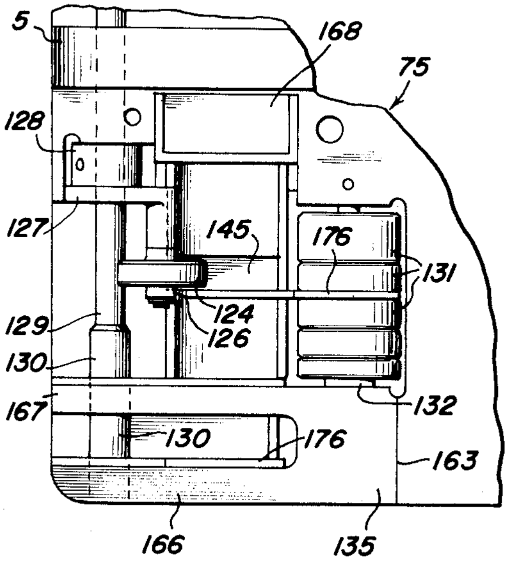
FIGURE 13 is a top view of the tape roller and loop forming assembly.

The apparatus is also provided with a tape depressor roller 124 (see FIGURES 10 and 13) which is rotatable about a shaft 126. The shaft 126 is supported at its upper end as illustrated in FIGURE 13, by an arm 127 that terminates in a hub 128 secured to a shaft 129. The shaft 129 is rotatably supported in and has one end passing through the wall 5. The other end of the shaft 129 is rotatably supported in a hollow shaft 130 mounted in the side wall 135 of the body member 75. A plurality of circular wheels or discs 140 are rotatably mounted on the shaft 129 between the walls 5 and 135, these being omitted from FIGURE 13 for the sake of clarity. The roller 124 is illustrated in its normal position in full lines in FIGURE 10 and in its tape loading or tight tape position in dotted lines in FIGURE 10 and solid lines in FIGURE 13. When the tape is to be loaded, the roller 124 is moved into the position illustrated in FIGURE 13 by an apparatus which will be described subsequently and the tape is passed over the rollers 140, under the roller 124 and over a plurality of rollers 131 which are rotatable about a shaft 132. The tape is then pulled forward into the region of the sprocket 77, the tape depressor 119 being raised at this time. Thereafter, the tape depressor 119 and the roller 124 are moved into their operative position, this being the positions illustrated in FIGURE 10. As indicated in the objects of the invention one of the features of the invention is the coupling between the tape depressor 119 and the roller 124 which causes the roller 124 to be raised into the position illustrated in FIGURE 13 when the tape depressor is raised out of engagement with the sprocket 77, and which moves the roller 124 into the position illustrated in FIGURE 10 when the tape depressor is moved into its operable position as illustrated in FIGURE 10. Also, the interconnection between the roller 124 and the tape depressor 119 is such that although the roller is moved to its two positions in accordance with the movement of the tape depressor 119, it is also capable of independent movement from the position illustrated in FIGURE 10 to the position illustrated in FIGURE 13 or to a position in which the roller is depressed into a recess 145 aligned with the roller 124 in the flow of the member 75, (see FIGURES 10 and 13). As will be described subsequently, this latter movement is employed to stop the operation of the apparatus in response to a loss of tape.

The roller 124 is employed to provide a loop of tape which permits sensing of a tight-tape and termination of the operation of the device before the tape is torn. It is essential in the tight-tape sensing mechanism employed in the present invention to provide storage for a predetermined amount of tape. The tight tape is detected when it is being advanced which occurs towards the end of a cycle; that is, at 390° to 420° of rotation of the shaft 1 as indicated in FIGURES 7 and 8.

At this time the apparatus is near the end of a cycle of operation and if the mechanism is operating with the solenoid normally continuously energized, there is insufficient time to de-energize the solenoid and raise the arm 23 before the next cycle of operation commences. Therefore, in order to prevent tapes from being torn by the apparatus, tape storage must be supplied having a capacity equal at least to the amount of tape fed during two cycles of operation. Tape storage is provided by the roller 124 since, when it is in its operative position as illustrated in FIGURE 9, the tape passes over the rollers 140 under the roller 124, and over the rollers 131, thus defining a loop of tape. When the tension on the tape becomes too great, the roller 124 is forced upward into the position illustrated in the FIGURE 13 and the loop of tape originally existing under the roller 124 becomes available to the apparatus for feeding purposes. When the roller 124 is raised, the apparatus is shut down just as it is when the tape depressor 119 is raised even though in a tight-tape condition, the depressor 119 is not raised with the roller 124.

Figure 16:
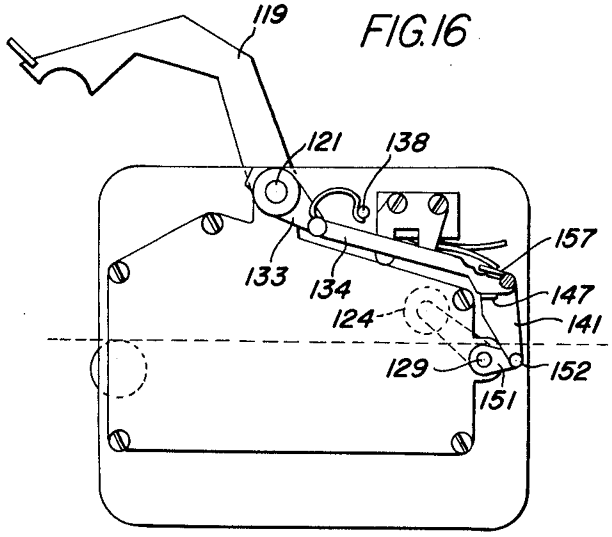
FIGURES 16 through 19 are views in elevation of the linkages interconnecting the tape depressor and the no-tape, tight-tape sensing mechanism under four different conditions of operation of the apparatus.

Referring now specifically to FIGURES 15 through 19 the linkage interconnecting the tape depressor 119 and the roller 124 is illustrated. The shaft 121 has secured thereto an arm 133 which is rotatable with the shaft 121. The arm 133 is pivotally connected to a link 134 by means of a shaft 136. An arcuate leaf spring is secured to and extends between the shaft 136 and a stud 138 secured to the wall 5 of the apparatus. The spring 137 produces an over center effect in conjunction with the arm 133 and the link 134 so that when the shaft 121 is rotated clockwise, in FIGURE 15, a sufficient distance to lower the shaft 136 below the center of the shaft 121, the linkages are biased to this latter position as illustrated in FIGURE 16. The link 134 is pivoted to a further link 141 by means of a pivot pin 142. A boss 143 is secured to the link 134 and a boss 144 is secured to the link 141 both bosses being disposed about the shaft 142. The shaft extends to the left as viewed in FIGURE 15 and supports a member 146 parallel to link 134. A rectangular arm 147 extends to the left from the link 141 and passes under the link 134 and the member 146. A stud 148 extends to the left from the link 134 and passes into an enlarged recess 149 in the member 146. The link 141 extends generally vertically downward and is pivoted to a link 151 by means of a stud 152. The link 151 is secured to the shaft 129 and rotates therewith.

A light spring 153 is connected between the stud 152 and the stud 148 while a heavy spring 154 is connected between the stud 152 and a right angle, outward extension 156 of the member 146. To complete the structure, a plate 157 is disposed under actuating arms 158 and 159 of microswitches 161 and 162. Both of the switches have normally closed contacts but the contacts of the switch 161 are open by downward movement of its actuator 158, while the contacts of the microswitch 162 are opened by an upward movement of its actuator 159.

Proceeding now with the description of the operation of the apparatus, it is initially assumed that tape depressor 119 and the roller 124 are in a downwardmost or counterclockwise position as illustrated in FIGURE 15. In order to permit threading of a tape both of these elements must be raised and this is accomplished by moving the tape depressor 119. Upon raising the depressor 119, the shaft 121 is rotated clockwise, thereby rotating the link 133 until its center is below the center of the stud 138 at which time the over center spring 137 exerts a downward force on the link 133. Clockwise rotation of the link 133 into the position illustrated in FIGURE 16 straightens the angle between the links 133 and 134 and moves the link 134 to the right. Movement of the link 134 to the right tends to decrease the angle between the links 134 and 141, thereby bringing the bottom of the link 134 into contact with the rectangular bar 147 which is a part of the link 141. Upon this occurrence, the links 134 and 141 appear as a single rigid member so that continued movement to the right of the link 134, as the tape depressor 119 is rotated clockwise, produces clockwise rotation of the link 151 and lowering of the links 134 and 141. Rotation of the link 151 also produces clockwise rotation of the shaft 129 which raises the roller 124 into the position illustrated in FIGURE 16 and permits the tape to be passed thereunder. It will be noted that, during this interval, the plate 157 is moved downward with the links 134 and 141 due to clockwise rotation of the link 151 and, in consequence, the actuator 158 is permitted to move downward and open the contacts of the microswitch 161.

Figure 17:
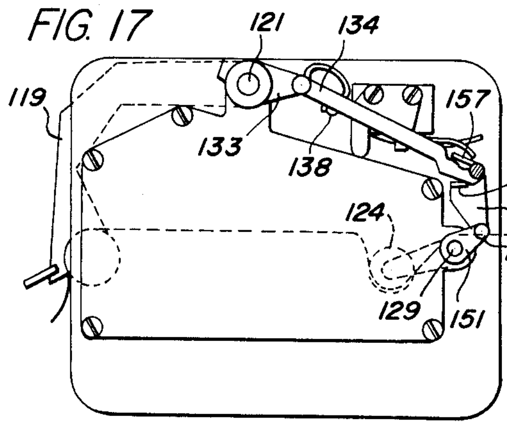
Figure 18:
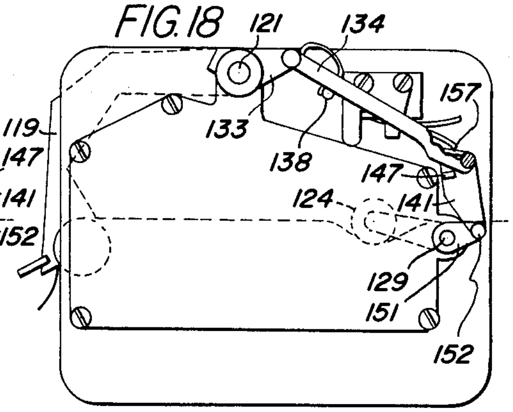

When the tape has been threaded, the tape depressor 119 is rotated counterclockwise and the apparatus assumes the position illustrated in FIGURE 17. It will be noted that, at this time, the over center spring 137 maintains a strong force on the stud 136 and anchors the stud in the position illustrated thereby providing fixed pivot for the link 134. Upon downward movement of the tape depresser 119, into the position illustrated in FIGURE 17, the movement to the left of the link 134 produces rotation of the link 141 which in turn rotates the link 151 and permits the roller 124 to assume the position illustrated in this figure. Under these conditions, the plate 147 is out of contact with the under surface of the link 134 but is in contact with the under side of the member 146. The purpose of this is to render the heavy spring 154 ineffective to apply a pressure to the roller 124 so that only the force of the light spring 153 is applied to the roller and excessive shearing load is not applied to the tape through roller 124 operating above slot 145. As was previously indicated, the shaft 142 is freely rotatable with respect to links 134 and 141 and the plate 147 is employed to position the member 146 under normal operating conditions. Thus, under normal conditions, the member 146 is in a position determined by the plate 147 and since the plate 147 and shaft 152 are both secured to link 141, the spring 154 does not apply a force to the system and more particularly to the roller 124. Further, the plate 147 is out of contact with the link 134 and the plate 157 is positioned intermediate the two positions of maximum movement so that the switches 161 and 162 are closed. If a tight tape condition arises, this condition being illustrated in FIGURE 18, the roller 124 is raised, rotating the shaft 129 and the link 151 clockwise. Clockwise rotation of the link 151 pulls downward on the link 141 and tends to increase or straighten out the angle between the links 134 and 141. In consequence, the rectangular bar 147 is removed from under the member 146 and the spring 154 pulls downward on the member causing it to rotate about the shaft 142 and come into contact with the stud 148. The heavy spring 154 now exerts its force on the stud 148 through the member 146 in an attempt to maintain the angle between the plates 134 and 141. When tight tape occurs, the roller 124 is raised against the force of spring 154 and at the same time the plate 157 is again lowered to cause the actuator 158 to open the contacts of the microswitch 161. It will be noted that, with this arrangement, the light spring 153 maintains the roller 124 in its downward position during running of the tape but that as soon as a tight tape condition begins to exist, the heavy spring 154 is brought into operation as the roller 124 raises to make the additional tape in the loop, formed by the roller, available to the reading mechanism and at the same time causing a rapid opening of the contacts of the microswitch 161. Additional roller pressure exerted by spring 154 insures that tight tape operation occurs only when the tape truly becomes tight, and not when wrinkles or splices flutter through the reader.

Figure 19:
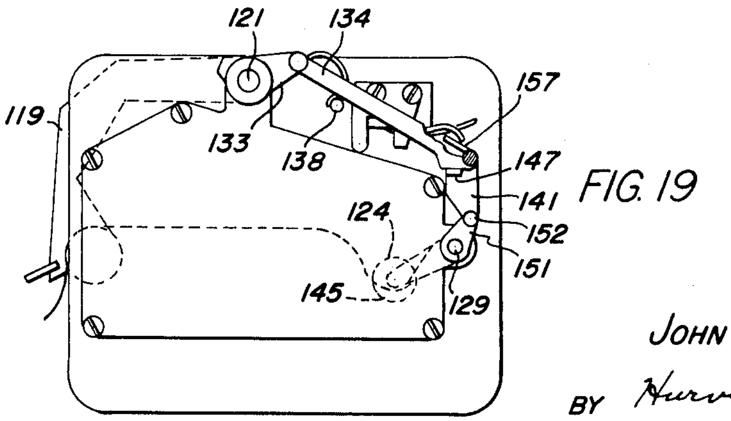

When tape is lost from the mechanism, and reference is now made to FIGURE 19, counterclockwise movement is imparted to the roller 124 by the spring 153 operating through the links 151, shaft 129, and arm 127 and the roller is depressed into the recess 145 in the floor of the member 75. The rotation of the links 134 and 141 relative to each other increases the angle therebetween and brings the rectangular bar 147 into contact with the bottom of the link 134. Once the bar 147 contacts the link 134 further movement of these two elements relative to one another is impossible so that continued movement of the link 151 causes the combined linkage 134 or 141 to rise, thereby raising the plate 157 and the actuator 159 of the microswitch therewith. Raising of the actuator 159 causes the contacts of the switch 162 to be opened and to energize the apparatus. The plate 157 is actually raised due to two motions; first, clockwise rotation about shaft 142 with link 141 and second, vertical movement with the link 141 after the bar 147 has contacted link 134. This arrangement insures sufficient movement of actuator 159 to open the contacts of switch 162. During this cycle of operation, the bar 147 contacts the member 146 so that there is no relative movement between the member 146 and the link 141 and, in consequence, the spring 154 is not brought into play since its two ends are fixed in space relative to one another. It is apparent then, that the apparatus of FIGURES 15 through 19 is capable of sensing no-tape or tight-tape conditions and of sensing when the tape depressor 119 is raised all with the same linkage and all to de-energize the system.

Figure 20:
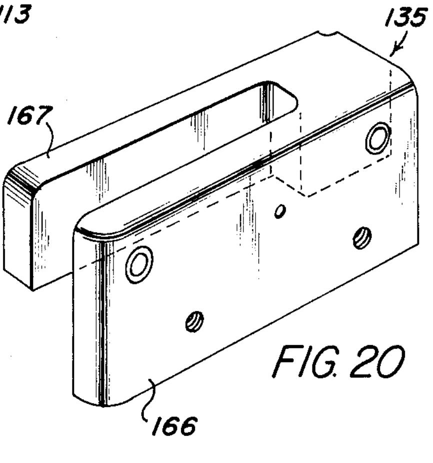
FIGURE 20 is a perspective view of the removable wall section of the apparatus.

As previously indicated, when reference was made to FIGURE 9 of the accompanying drawings, the side wall of the body member 75 is removed but it is partially illustrated in FIGURE 13 of the accompanying drawings. Reference to FIGURE 13 indicates that the rollers 131 are substantially wholly enclosed by the plate 74, by the walls 5 and 135 and the tape loop defining region. Therefore, it is extremely difficult to clean out paper and other material which may accumulate within the region of the rollers 131 and 124 without almost completely disassembling the apparatus. To permit ready access to this region, the wall 135 is removable. More particularly, it is separated from the main body 75 along a line 163 in FIGURE 13 and a line 164 in FIGURE 11. It will be noted that this wall 135 is forked adjacent the back end of the apparatus and provides two finger portions 166 and 167. The separation along lines 163 and 164 separates the main body portion of the wall 135 and the finger 166 of the apparatus and in order to separate the finger 167, the body 75 is further cut horizontally along the bottom of the finger 167. Referring specifically to FIGURE 20 which illustrates the portion of the apparatus removable from the body 75, it will be noted that the finger 167 is shorter in height than the finger 166, indicating that the finger 166 is removed by a vertical cut through the bottom of the member 75 whereas the finger 167 removes by cutting horizontally along the upper surface of the body 75. The fingers 166 and 167 define a compartment for storage of tape guide clips 176 which when in use clip onto shafts 132 and 130 between a selected set of rollers 131 and 140 to provide edge guiding of tape. The apparatus is designed to accept an eight hole tape and the total width of the rollers 140, and the rollers 131, and the recesses in which they are disposed are designed for such a tape. If a smaller tape is employed one of the clips 176 is disposed between appropriate ones of the rollers 140 and 131 and extend above the tops of the rollers to guide the edge of the tape closest to the wall 5. The side wall 135 is removably securable to the main body 75 by means of screws or other suitable temporary fastenings.

As previously indicated, it is an object of the invention to render the apparatus explosion proof. The body 75 is provided with an aperture 168, which communicates with a hollow 169 formed on the underside of the body 75. The hollow 169 communicates with the recess 105′ and the whole region is sealed by mating walls 171 and 172 formed on the body 75 and bottom cover 113, respectively. The aperture 168 mates with an aperture (not illustrated) in the member 74, the members 74 and 75 providing an air tight seal therebetween in the region of the aligned apertures. In consequence, a sealed chamber is formed extending from the recess 105′ through hollow 169, aperture 168 and the aperture in the member 74 to the region above member 74. The contact region above plate 74 is enclosed by a top cover 173 which contacts plate 74 in air tight relation. The top cover 173 is provided with a quench screen 174 to prevent propagation of a fire from the apparatus should it be operated in a combustible atmosphere.

The structure thus recited is explosion proof in that those regions containing open switch contacts, which are likely to produce sparks, communicate with the ambient atmosphere only through the blow-out screen which prevents flames, resulting from fire or explosion in the apparatus, from passing to the exterior of the equipment.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A reader mechanism for perforated members comprising means for sensing perforations in a perforated member, movable between a rest and a sensing position, a first arm movable between a first position and a second position, said first arm preventing movement of said means for sensing from said rest position to said sensing position when in said first position and preventing movement of said means for sensing from said sensing position to said rest position when in said second position, a second arm movable between one and another position, said second arm when in said one position preventing movement of said first arm from said first to said second position and when in said other position preventing movement of said first arm from said second to said first position, means for cyclically moving said second arm from between said one and said other position and means for selectively urging said first arm toward said second position.

2. The combination in accordance with claim 1 wherein said means for sensing comprises at least one sensing member, means for urging said sensing member toward a sensing position, a third arm connected to said sensing member for movement therewith, said first arm when in said first position being positioned in the path of movement of said third arm when said means for sensing is in said rest position, and means for moving said third arm from said sensing to said rest position upon movement of said second arm from said other to said one position.

3. The combination in accordance with claim 1 further comprising feed means for intermittently advancing a member to be sensed, a pivoted member movable between a quiescent and an actuated position, latch means responsive to said first arm obtaining said second position and said second arm obtaining said other position for moving said pivoted member to said actuated position, and means responsive to said pivoted member obtaining said actuated position to energize said feed means.

4. The combination in accordance with claim 3 wherein said latch means comprises a first body, a second body movable between a first and a second position, said first body having a portion disposed in the path of movement of said second body, means responsive to movement of said first arm toward said second position for moving said second body in a direction away from said first body by a distance insufficient to withdraw said second body from over said first body, means responsive to movement of said second arm to said other position to move said first body away from said second body sufficiently to withdraw said first body from the path of movement of said second body, means moving said second body to said second position, and means responsive to said second body obtaining said second position for permitting said pivoted member to move from said quiescent position to said actuated position.

5. The combination in accordance with claim 3 wherein said feed means comprises a pawl and a toothed wheel, and means responsive to said pivoted member moving from said quiescent position to said actuated position for inserting said pawl between teeth of said toothed wheel.

6. The combination in accordance with claim 5 further comprising a detent biased into engagement with said toothed wheel, means for moving said detent out of engagement with said toothed wheel, and a perforated member drive wheel coupled to said toothed wheel.

7. The combination in accordance with claim 6 further comprising a mechanical counter connected to said wheel for actuation thereby.

8. An apparatus for sensing perforated members comprising at least one perforated member sensing mechanism, means for moving said mechanism between a rest position and a sensing position, feed means for moving a perforated member along a path intercepted by said sensing mechanism when in said sensing position, said feed means comprising a toothed wheel, a pawl movable between a space position and a feed position between teeth of said toothed wheel, means for rotating said pawl about the axis of said toothed wheel to effect movement of said perforated member, and drive means for actuating said means for rotating only when said sensing mechanism is in a position other than said sensing position and for actuating said means for moving only when said feeding mechanism is in a position other than said feed position, said drive means imparting controlled acceleration and deceleration to said pawl.

9. A perforated member sensing mechanism comprising a reciprocatable bail, drive means for reciprocating said bail, at least one sensing pin supported by said bail for movement with respect thereto, means for intermittently feeding a perforated member, said bail moving said sensing pin along a path intercepting areas of a perforated member in which perforations may be located, said pin moving from one position to another when encountering an unperforated area of a perforated member, switch means for sensing when said pin obtains said other position and means for actuating said means for feeding, said means for actuating including a source of motion, sensing means movable only in response to completion of reciprocation of said bail, said means for actuating coupling said feeding means to said source of motion upon movement of said sensing means.

10. The combination in accordance with claim 9 wherein said bail comprises a U-shaped member having a base and two legs, means for pivotally supporting said legs for rotation about an axis parallel to said base, said sensing pin being slidably mounted in said base, means for biasing said bail towards the perforated member, an arm disposed under said bail and rotatable between a first and a second position, said arm permitting said bail to move toward said perforated member for a sensing operation upon movement from said first position to said second position.

11. The combination in accordance with claim 10 wherein said switch means comprises a leaf spring contact disposed in engagement with said sensing pin, said leaf spring contact constituting said means for biasing.

12. The combination in accordance with claim 9 wherein said means for feeding includes a sprocket and wherein said sprocket and said sensing pins are disposed on opposite sides of the path of the perforated member.

13. The combination in accordance with claim 9 wherein there are provided a plurality of sensing pins disposed in a column perpendicular to the path of movement of the perforated member, said means for feeding including a sprocket of lesser width than the spacing between said sensing pins, said sensing pins and said sprocket being located immediately adjacent one another and on opposite sides of the path of the perforated member with two of said pins straddling said sprocket.

14. The combination in accordance with claim 9 comprising a further sensing pin supported by said bail for movement along a path intercepting areas of the perforated member which are normally unperforated, said further sensing pin being moved from one to another position upon engaging an unperforated area of said perforated member and further switch means for determining the position of said further sensing pin upon movement of said first mentioned sensing pin toward the perforated member by said bail.

15. The combination in accordance with claim 9 wherein said drive means includes a sprocket having teeth for engaging feed holes in the perforated member, a tape depressor for pressing the perforated member against said sprocket, said tape depressor being pivoted about an end remote from said sprocket between a first position remote from said sprocket and a second position contacting said sprocket, a roller rotatable about its arm axis and about a second axis parallel thereto but remote therefrom, said roller being rotatable about said second axis between one position and another position, said roller being positioned relative to the path of movement of the perforated member to form a loop therein when in said one position, intercoupling means for moving said roller from said one position to said other position and from said other position to said one position upon movement of said tape depressor from said first position to said second position and from said second position to said first position respectively, said intercoupling means further comprising means permitting movement of said roller from said another position to said one position while said tape depressor remains in said second position.

16. The combination in accordance with claim 15 further comprising switch means for sensing whenever said roller is in said one position.

17. A perforated member sensing mechanism comprising means for intermittently sensing the pattern of perforations in a flexible tape, means for intermittently feeding said tape at intervals intermediate operation of said means for sensing, first movable means actuatable between a first and a second position for maintaining said tape in engagement with said means for feeding when in said second position, second movable means actuatable between a first and a second position for defining a loop in the tape when in said second position, a first switch, and means interconnecting said movable means for opening said first switch and for positioning said second movable means in said first position when said first means is in said first position, for positioning said second movable means in said second position and closing said first switch when said first movable means is in said second position, and for opening said first switch when said second movable means is moved to said first position independently of said first movable means.

References Cited by the Examiner

UNITED STATES PATENTS

| | | | |
|---|---|---|---|
| 1,771,260 | 7/30 | Langston | 226—41 |
| 1,863,097 | 6/32 | Borel | 235—61.6 |
| 2,134,284 | 10/38 | Keefe | 235—61.11 |
| 2,166,551 | 7/39 | Perry | 226—41 |
| 2,619,532 | 11/52 | Blodgett | 235—61.11 |
| 2,850,238 | 9/58 | Hoffman | 235—61.11 |
| 2,999,625 | 9/61 | La Pointe | 226—61 |
| 3,007,636 | 11/61 | Vossen | 235—61.11 |

MALCOLM A. MORRISON, *Primary Examiner.*

LEO SMILOW, WALTER W. BURNS, Jr., *Examiners.*